US012687293B2

(12) United States Patent 
Bell et al.

(10) Patent No.: US 12,687,293 B2 
(45) Date of Patent: Jul. 21, 2026

(54) BURNER WITH ALTERNATE MODES FOR FLEXIBLE OPERATION

(71) Applicants: Robert L. Bell, Amherst, NY (US); Gaurav Kulkarni, Collegeville, PA (US)

(72) Inventors: Robert L. Bell, Amherst, NY (US); Gaurav Kulkarni, Collegeville, PA (US)

(73) Assignee: Praxair Technology, Inc., Danbury, CT (US)

( * ) Notice: Subject to any disclaimer, the term of this patent is extended or adjusted under 35 U.S.C. 154(b) by 440 days.

(21) Appl. No.: 18/357,558

(22) Filed: Jul. 24, 2023

(65) Prior Publication Data

US 2024/0044486 A1 Feb. 8, 2024

Related U.S. Application Data

(60) Provisional application No. 63/395,384, filed on Aug. 5, 2022.

(51) Int. Cl.
| | |
|---|---|
| *F23D 14/22* | (2006.01) |
| *C03B 5/235* | (2006.01) |
| *F23D 23/00* | (2006.01) |
| *F23L 7/00* | (2006.01) |
| *F23N 1/02* | (2006.01) |

(52) U.S. Cl.
CPC ............ *F23D 14/22* (2013.01); *C03B 5/2353* (2013.01); *F23D 23/00* (2013.01); *F23L 7/007* (2013.01); *F23N 1/02* (2013.01); *C03B 2211/60* (2013.01)

(58) Field of Classification Search
None
See application file for complete search history.

(56) References Cited

U.S. PATENT DOCUMENTS

| | | | |
|---|---|---|---|
| 5,957,678 A | 9/1999 | Endoh et al. | |
| 9,689,612 B2 * | 6/2017 | Gangoli | F23N 5/10 |
| 10,584,051 B2 | 3/2020 | D'Agostini et al. | |
| 10,859,260 B2 * | 12/2020 | Iyoha | C03B 5/2353 |

(Continued)

FOREIGN PATENT DOCUMENTS

| | | | | |
|---|---|---|---|---|
| DE | 102004037620 A1 | 2/2006 | | |
| EP | 1078892 A2 * | 2/2001 | ........... | C03B 5/2353 |

*Primary Examiner* — Jorge A Pereiro 
(74) *Attorney, Agent, or Firm* — Andrew G. Melick

(57) ABSTRACT

A burner comprises a central conduit, a first annular conduit, and a nozzle plate across the outlet of the first annular conduit, wherein the nozzle plate comprises a plurality of orifices that extend through the nozzle plate, and a second annular conduit which opens into a downstream space, wherein the central conduit and the first annular conduit are controllably connected to a first reactant and the second annular conduit is controllably connected to a source of a second reactant, wherein one of the first and second reactants comprises fuel and the other of the first and second reactants comprises oxygen. Combustion apparatus comprises a plurality of the burners, preferably arranged in two planes each of which contain at least one of the burners. A fuel-rich flame can be emitted in one of the planes and a fuel-lean flame can be emitted in the other plane. The fuel-rich and fuel-lean nature of the flames emitted in the respective planes can be periodically alternated.

29 Claims, 6 Drawing Sheets

(56)             References Cited

U.S. PATENT DOCUMENTS

| | | | |
|---|---|---|---|
| 2010/0089383 A1* | 4/2010 | Cowles | F23C 3/004 |
| | | | 126/360.1 |
| 2010/0104990 A1* | 4/2010 | Sarmiento-Darkin | |
| | | | F23D 14/22 |
| | | | 431/353 |
| 2011/0000261 A1 | 1/2011 | Prabhakar et al. | |
| 2011/0061642 A1* | 3/2011 | Rouchy | C03B 5/235 |
| | | | 431/2 |
| 2013/0220300 A1* | 8/2013 | Cowles | F23C 5/08 |
| | | | 126/360.1 |
| 2014/0090422 A1* | 4/2014 | Charbonneau | F23C 5/08 |
| | | | 65/346 |
| 2016/0348904 A1* | 12/2016 | Gangoli | F23N 1/002 |
| 2018/0237323 A1* | 8/2018 | D'Agostini | F23D 14/56 |
| 2021/0122659 A1* | 4/2021 | D'Agostini | F23L 7/007 |

* cited by examiner

BURNER WITH ALTERNATE MODES FOR FLEXIBLE OPERATION

RELATED APPLICATIONS

The present application claims the benefit of priority from U.S. Provisional Application Ser. No. 63/395,384, filed Aug. 5, 2022, which is incorporated by reference herein in its entirety.

FIELD OF THE INVENTION

The present invention relates to combustion in industrial furnaces such as furnaces that are used in the production of glass.

BACKGROUND OF THE INVENTION

The manufacture of glass products typically involves melting a mixture of glassmaking ingredients in a glassmelting furnace to produce molten glass which is then treated and formed into the desired glass products. Typical glassmaking ingredients (which can be used as well in the practice of this invention) include oxides, hydroxides, silicates and sulfates of sodium and potassium, and mixtures thereof, and crushed and broken pieces of glass. The heat for melting the glassmaking ingredients in the furnace is often provided by combustion of fuel inside the furnace, often at burners situated in one or more walls of the furnace that generate flames which extend from the burner into the interior of the furnace.

Unfortunately, the melting operations of this type have been known to cause formation of a layer of bubbles, usually referred to as foam, on the surface of the molten glass. This foam is undesirable as it interferes with achieving efficient heat exchange in the furnace from the flames to the glassmaking ingredients and to the bath of molten glass. The foam can also degrade the quality of the molten glass.

The present invention provides useful ability to minimize or prevent formation of foam on the surface of a bath of molten glass. The present invention also provides reduced formation of undesired combustion byproducts such as nitrogen oxides ("NOx").

Burners used in furnaces such as (but not limited to) glassmelting furnaces can also suffer from fouling or plugging of ports in the furnace walls through which combustion reactants are desired to be fed. The present invention also provides effective ability to limit or avoid this fouling and plugging.

BRIEF SUMMARY OF THE INVENTION

One aspect of the present invention is a burner comprising:
  a central conduit having a central axis and terminating in a central outlet which opens into a downstream space;
  a first annular conduit surrounding the central conduit, the first annular conduit and the central conduit being separated by an annular wall, wherein the first annular conduit terminates in an outlet which opens into said downstream space, wherein the first annular conduit comprises a nozzle plate across the outlet of the first annular conduit, wherein the nozzle plate comprises a plurality of orifices that extend through the nozzle plate from within the first annular conduit to the downstream space;

wherein the central conduit and the first annular conduit are each connected to a source of a first reactant through mechanism with which the flow of the first reactant from the source thereof into the central conduit and the flow of the first reactant from the source thereof into the first annular conduit can be controlled; and
  a second annular conduit surrounding the first annular conduit and terminating in a second annular outlet which opens into said downstream space, wherein the second annular conduit is connected to a source of a second reactant through mechanism with which the flow of the second reactant from the source thereof into the second annular conduit can be controlled;
  wherein one of the first and second reactants comprises fuel and the other of the first and second reactants is oxidant that comprises oxygen.

Another aspect of the present invention is combustion apparatus comprising:
  a first burner comprising
  a first central conduit having a central axis and terminating in a first central outlet which opens into a first downstream space;
  a first annular conduit surrounding the first central conduit, the first annular conduit and the first central conduit being separated by an annular wall, wherein the first annular conduit terminates in an outlet which opens into said first downstream space, wherein the first annular conduit comprises a nozzle plate across the outlet of the first annular conduit, wherein the nozzle plate comprises a plurality of orifices that extend through the nozzle plate from within the first annular conduit to the first downstream space;
  wherein the first central conduit and the first annular conduit are each connected to a source of a first reactant through mechanism with which the flow of the first reactant from the source thereof into the first central conduit and the flow of the first reactant from the source thereof into the first annular conduit can be controlled; and
  a second annular conduit surrounding the first annular conduit and terminating in a second annular outlet which opens into said first downstream space, wherein the second annular conduit is connected to a source of a second reactant through mechanism with which the flow of the second reactant from the source thereof into the second annular conduit can be controlled; and
  a second burner comprising
  a second central conduit having a central axis and terminating in a second central outlet which opens into a second downstream space;
  a third annular conduit surrounding the second central conduit, the third annular conduit and the second central conduit being separated by an annular wall, wherein the third annular conduit terminates in an outlet which opens into said second downstream space, wherein the third annular conduit comprises a nozzle plate across the outlet of the third annular conduit, wherein the nozzle plate comprises a plurality of orifices that extend through the nozzle plate from within the third annular conduit to the second downstream space;
  wherein the second central conduit and the third annular conduit are connected to a source of said first reactant through mechanism with which the flow of the first reactant from the source thereof into the second central conduit and the flow of the first reactant from the source thereof into the third annular conduit can be controlled; and a fourth annular conduit surrounding the third annular conduit and terminating in a fourth annular outlet which opens into said second downstream space, wherein the fourth annular conduit is connected to a source of said second reactant through mechanism with which the flow of the second reactant from the source thereof into the fourth annular conduit can be controlled;

wherein the central axis of the first central conduit is above the central axis of the second central conduit;

wherein one of the first and second reactants comprises fuel and the other of the first and second reactants is oxidant that comprises oxygen.

Another aspect of the present invention is a method of combustion in a furnace, comprising:

providing the aforementioned combustion apparatus;

feeding fuel from the first central outlet and from the first annular conduit nozzle plate of said first burner into a first downstream space within said furnace;

feeding oxidant from the second annular outlet of said first burner into said first downstream space, and combusting said fuel fed from the first central outlet and from the first annular conduit nozzle plate with said oxidant fed from the second annular outlet, to create a mixture of products of said combustion in said first downstream space; while feeding fuel from the second central outlet and from the third annular conduit nozzle plate of said second burner into a second downstream space within said furnace;

feeding oxidant from the fourth annular outlet of said second burner into said second downstream space, and combusting said fuel fed from the second central outlet and from the third annular conduit nozzle plate with said oxidant fed from the fourth annular outlet, to create a mixture of products of said combustion in said second downstream space;

wherein said first downstream space is located above said second downstream space.

Another embodiment of combustion in a furnace according to the present invention comprises:

providing combustion apparatus that comprises a plurality of first burners comprising a first central conduit having a central axis and terminating in a first central outlet which opens into a first downstream space;

a first annular conduit surrounding the first central conduit, the first annular conduit and the first central conduit being separated by an annular wall, wherein the first annular conduit terminates in an outlet which opens into said first downstream space, wherein the first annular conduit comprises a nozzle plate across the outlet of the first annular conduit, wherein the nozzle plate comprises a plurality of orifices that extend through the nozzle plate from within the first annular conduit to the first downstream space;

wherein the first central conduit and the first annular conduit are each connected to a source of a first reactant through mechanism with which the flow of the first reactant from the source thereof into the first central conduit and the flow of the first reactant from the source thereof into the first annular conduit can be controlled; and a second annular conduit surrounding the first annular conduit and terminating in a second annular outlet which opens into said first downstream space, wherein the second annular conduit is connected to a source of a second reactant through mechanism with which the flow of the second reactant from the source thereof into the second annular conduit can be controlled;

and a plurality of second burners comprising a second central conduit having a central axis and terminating in a second central outlet which opens into a second downstream space;

a third annular conduit surrounding the second central conduit, the third annular conduit and the second central conduit being separated by an annular wall, wherein the third annular conduit terminates in an outlet which opens into said second downstream space, wherein the third annular conduit comprises a nozzle plate across the outlet of the third annular conduit, wherein the nozzle plate comprises a plurality of orifices that extend through the nozzle plate from within the third annular conduit to the second downstream space;

wherein the second central conduit and the third annular conduit are connected to a source of said first reactant through mechanism with which the flow of the first reactant from the source thereof into the second central conduit and the flow of the first reactant from the source thereof into the third annular conduit can be controlled; and a fourth annular conduit surrounding the third annular conduit and terminating in a fourth annular outlet which opens into said second downstream space, wherein the fourth annular conduit is connected to a source of said second reactant through mechanism with which the flow of the second reactant from the source thereof into the fourth annular conduit can be controlled;

wherein the central axes of all of said first burners are above the central axes of all of said second burners;

wherein one of the first and second reactants comprises fuel and the other of the first and second reactants is oxidant that comprises oxygen;

feeding fuel from the first central outlets and from the first annular conduit nozzle plates of each of said first burners into a first downstream space within said furnace;

feeding oxidant from the second annular outlets of each of said first burners into said first downstream space, and combusting said fuel fed from the first central outlets and from the first annular conduit nozzle plates with said oxidant fed from the second annular outlets, to create a mixture of products of said combustion which pass into said first downstream space; while feeding fuel from the second central outlets and from the third annular conduit nozzle plates of each of said second burners into a second downstream space within said furnace;

feeding oxidant from the fourth annular outlets of each of said second burners into said second downstream space, and combusting said fuel fed from the second central outlets and from the third annular conduit nozzle plates with said oxidant fed from the fourth annular outlets, to create a mixture of products of said combustion which pass into said second downstream space.

In another embodiment of the present invention, the mixture of products of combustion which pass into one of said first downstream space and said second downstream space is fuel-rich and the mixture of products of combustion which pass into the other of said first downstream space and said second downstream space is fuel-lean.

In a preferred application of this embodiment, alternatingly (A) the mixture of products of combustion which pass into said first downstream space is fuel-rich and the mixture of products of combustion which pass into said second downstream space is fuel-lean, and (B) the mixture of products of combustion which pass into said first downstream space is fuel-lean and the mixture of products of combustion which pass into said second downstream space is fuel-rich.

A preferred aspect of the present invention is a method of operating the aforementioned combustion apparatus to heat the interior of a furnace and to heat the contents within a furnace, such as to heat a glass furnace containing a bath of molten glass, comprising alternatingly carrying out steps (A) and (B):

(A) feeding fuel from the first central outlet and from the first annular conduit nozzle plate into said first downstream space;

feeding oxidant from the second annular outlet into said first downstream space, in an amount which comprises an amount of oxygen that is insufficient to completely combust with all of said fuel fed from said first central outlet and from said first annular conduit nozzle plate; and incompletely combusting said fuel fed from the first central outlet and from the first annular conduit nozzle plate with said oxidant fed from the second annular outlet, to create a fuel-rich mixture of products of said combustion in said first downstream space; while feeding fuel from the second central outlet and from the third annular conduit nozzle plate into the second downstream space;

feeding oxidant from the fourth annular nozzle into the second downstream space, in an amount which comprises an amount of oxygen that exceeds the amount of oxygen that is necessary to completely combust with all of said fuel fed from said second central outlet and from said third annular conduit nozzle plate; and combusting the fuel fed from the second central outlet and from the third annular conduit nozzle plate with said oxidant fed from the fourth annular outlet, to create a fuel-lean mixture of products of said combustion in said second downstream space;

wherein said first downstream space is located above said second downstream space; and feeding said fuel-rich mixture from said first downstream space into the space above the surface of said bath, and feeding said fuel-lean mixture into the space above the surface of said bath between said fuel-rich mixture and the surface of said bath; and (B) feeding fuel from the first central outlet and from the first annular conduit nozzle plate into the first downstream space;

feeding oxidant from the second annular outlet into said first downstream space, in an amount which comprises an amount of oxygen that exceeds the amount of oxygen that is necessary to completely combust with all of said fuel fed from said first central outlet and from said first annular conduit nozzle plate; and combusting the fuel fed from the first central outlet and from the first annular conduit nozzle plate with said oxidant fed from the second annular conduit, to create a fuel-lean mixture of products of said combustion in said first downstream space, while feeding fuel from the second central outlet and from the third annular conduit nozzle plate into the second downstream space;

feeding oxidant from the fourth annular conduit into the second downstream space in an amount which comprises an amount of oxygen that is insufficient to completely combust with all of said fuel fed from said second central outlet and from said third annular conduit nozzle plate; and incompletely combusting the fuel fed from the second central outlet and from the third annular conduit nozzle plate with said oxidant fed from the fourth annular conduit to create a fuel-rich mixture of products of said combustion in said second downstream space; and feeding said fuel-lean mixture from said first downstream space into the space above the surface of said bath, and feeding said fuel-rich mixture into the space above the surface of said bath between said fuel-lean mixture and the surface of said bath.

Advantageously, the method alternates between (A) and (B) in response to a detected characteristic of said bath of molten glass.

Preferred embodiments of these combustion methods comprise continuously combusting said fuel fed from the nozzle plates that are across the outlets of said first and third annular conduits.

As used herein, a stream or mixture that is "fuel-rich" contains one or more substances selected from the group consisting of fuel that can combust with oxygen and products formed by incomplete combustion of fuel with oxygen, and contains no oxygen or contains oxygen but in amount that is insufficient to completely combust the fuel and products of incomplete combustion that are present.

As used herein, a stream or mixture that is "fuel-lean" contains oxygen and one or more substances selected from the group consisting of fuel that can combust with oxygen, and products formed by incomplete combustion of fuel with oxygen, wherein the amount of oxygen present is equal to or more than the amount required to completely combust all of said substances.

As used herein, to "completely combust" fuel means to react all hydrogen in the fuel (as $H_2$ and as bound to carbon in a hydrocarbon) with oxygen to form $H_2O$ and to react all carbon (if any) in the fuel (as elemental C or as bound in a hydrocarbon) to $CO_2$.

As used herein, that a first plane is "below" or "above" a second plane means that there is space between the two planes, and a single horizontal line cannot pass through both planes; and that an axis of a conduit is "above" or "below" the axis of another conduit means that there is space between the axes and that a single horizontal line cannot pass through both axes; and that a space is "below" or "above" another space means that a single horizontal line cannot pass through both of said spaces.

DETAILED DESCRIPTION OF THE INVENTION

The present invention is useful in furnaces of the type that includes an enclosed space in which combustion occurs to heat material that is present in the enclosed space. The heat can be used to melt or fuse material, such as with glass-melting furnaces and cement kilns, or to incinerate material, such as with incinerators. As described below, one preferred application is with glassmelting furnaces, especially glassmelting furnaces that melt material that is prone when being melted to emanate substances that can condense onto surfaces of the burners such as their associated outlets and ports.

The present invention can be implemented in furnaces wherein fuel and gaseous oxidant are fed toward the furnace interior through openings which are referred to herein as outlets, or ports.

Figure 1:
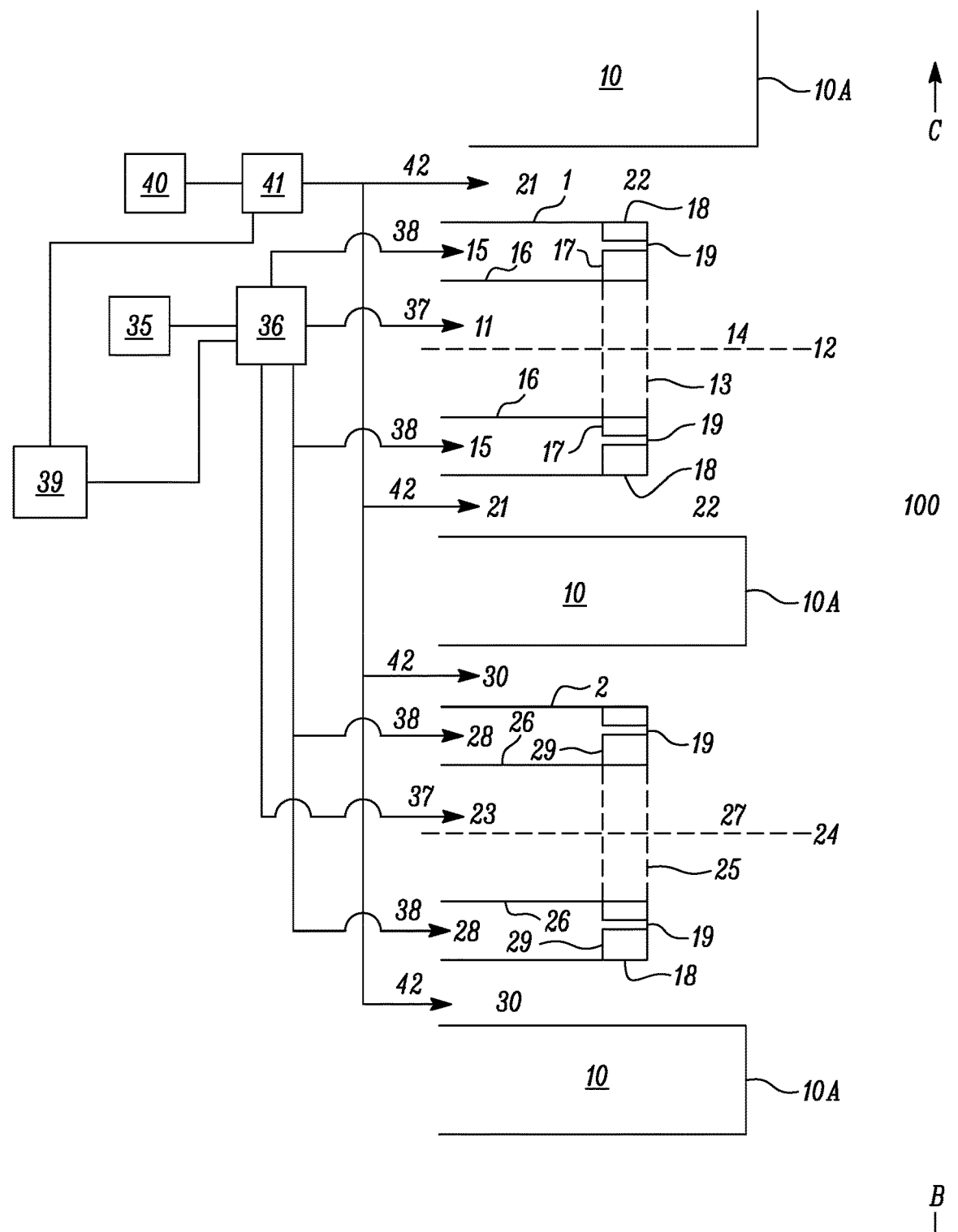
FIG. 1 is a cross-sectional view of a combustion apparatus including two burners according to the present invention.
Figure 2:
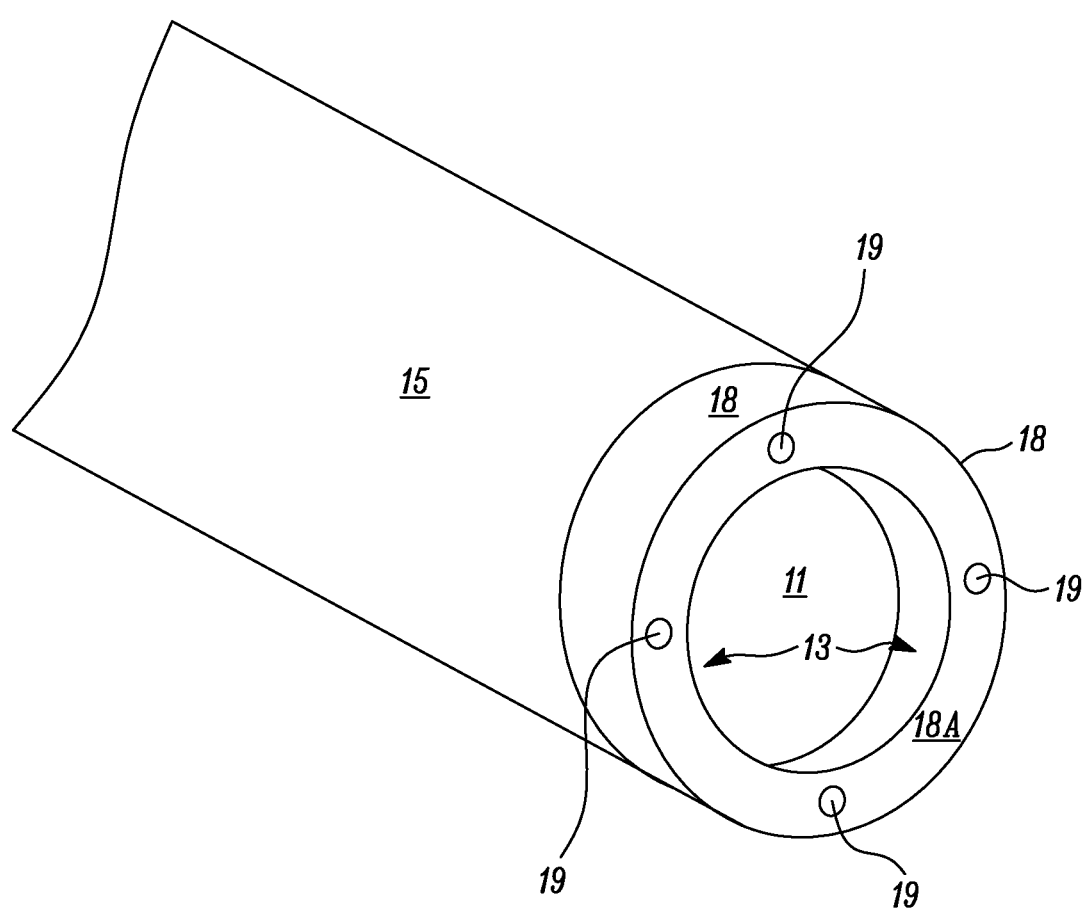
FIG. 2 is a perspective view of the end of a burner according to the present invention.

Reference is first made to FIGS. 1 and 2, which illustrate burners 1 and 2 each of the type that is useful in the present invention.

FIG. 1 shows a cross-sectional view, from the side in a vertical plane, of two burners 1 and 2 as positioned within a burner block 10. In this view, the arrow pointing toward "B" designates where the bath of molten glassmaking materials (referred to herein as "the bath") is relative to the two burners 1, and the arrow pointing toward "C" designates where the crown (roof) of the furnace is relative to the two burners 1. Thus, in FIG. 1 the burner 1 that opens into space 14 is closer to the crown and is above the other burner 1 that opens into space 27 and is closer to the bath.

As shown in FIG. 1, burner 1 includes central conduit 11 which has a central axis 12. The central conduit 11 terminates at one end (its downstream end) in a central outlet 13 which opens into a downstream space 14 that is outside, and downstream, of outlet 13. First annular conduit 15 surrounds central conduit 11, with first annular conduit 15 and central conduit 11 being separated by an annular wall 16. First annular conduit 15 terminates at one end in an outlet 17 which opens into said downstream space 14. Downstream space 14 can be the interior of the furnace, but is preferably a port that is recessed within burner block 10 relative to the interior 100 of the furnace (that is, so that the respective outlets 13 and 17 are farther from the furnace interior 100 than is the surface 10A of burner block 10 that faces the furnace interior 100).

As shown in FIGS. 1 and 2, nozzle plate 18 lies across the outlet 17 of first annular conduit 15 but does not cover outlet 13. The face 18A on the downstream side of nozzle plate 18 is preferably coplanar with the central outlet 13. The downstream end of annular wall 16 is preferably at the interior (upstream) face of nozzle plate 18 but annular wall 16 may extend into downstream space 14. Nozzle plate 18 comprises a plurality of orifices 19 that pass through nozzle plate 18 from within the interior of first annular conduit 15 to the downstream space 14. Nozzle plate 18 is sealed to what would otherwise be the open outlet 17, so that any gas flowing within first annular conduit 15 can leave first annular conduit 15 through the orifices 19.

The number of orifices 19 in a nozzle plate 18, and the cross-sectional diameters of the orifices 19, should be effective to cause gas flowing in first annular conduit 15 to emerge from orifices 19 at a velocity higher than the velocity of the gas in the first annular conduit 15. One useful characteristic would be that the ratio of the sum of the cross-sectional areas of all of the orifices 19 in a given nozzle plate, to the total area of the surface of the nozzle plate that is in contact with gas within first annular conduit 15, is up to 1:2 and preferably up to 1:10 or even 1:100. There are preferably 1 to 50 orifices 19 in each nozzle plate 18, more preferably from 2, 3, or 4 up to 10 or 20. These characteristics apply to each nozzle plate that is employed in apparatus of the present invention.

Referring again to FIG. 1, a second annular conduit 21 surrounds the first annular conduit 15 and terminates in a second annular outlet 22 which opens into the downstream space 14. The outer wall of second annular conduit 21 can be a surface of the opening through burner block 10, as shown in FIG. 1, or can be a separate annular component such as a cylinder of metal.

As shown in FIG. 1, a second burner 2 is present which includes central conduit 23 which has a central axis 24. The central conduit 23 terminates at one end (its downstream end) in a central outlet 25 which opens into downstream space 27 that is outside, and downstream, of outlet 25. Third annular conduit 28 surrounds central conduit 23, with third annular conduit 28 and central conduit 23 being separated by an annular wall 26. Third annular conduit 28 terminates at one end in an outlet 29 which opens into downstream space 27. Downstream space 27 can be the interior of the furnace, but is preferably a port that is recessed within burner block 10 relative to the interior 100 of the furnace (that is, so that the respective outlets 25 and 29 are farther from the furnace interior 100 than is the surface 10A of burner block 10 that faces the furnace interior 100).

Referring again to FIG. 1, a fourth annular conduit 30 surrounds the third annular conduit 28 and terminates in a fourth annular outlet 31 which opens into the downstream space 27. The outer wall of fourth annular conduit 30 can be a surface of the opening through burner block 10, as shown in FIG. 1, or can be a separate annular component such as a cylinder of metal.

The aforementioned burners 1 and 2 are preferably positioned in a burner block 10 as further described below. The burner block should be constructed of material that is capable of withstanding high temperatures in excess of 1500 F, up to 3500 F, without melting or disintegrating. Materials that are suitable for such use are well known in the field of high temperature furnaces and include refractory inorganic materials such as AZS. Each central conduit 11 and 23 and the first and third annular conduits 15 and 28 are preferably made of material that withstands the aforementioned high temperatures.

The central conduits 11 and 23, the first annular conduit 15, and the third annular conduit 28 are each connected to a source 35 of a first reactant through mechanism represented as 36 which is capable of controlling the flow of the first reactant from the source 35 into the central conduits 11 and 23, via feed lines represented as 37, and which is capable of controlling the flow of the first reactant from the source 35 thereof into each of the first and third annular conduits 15 and 28 via feed lines represented as 38.

The second and fourth annular conduits 21 and 30 are connected to a source 40 of a second reactant through mechanism represented as 41 which is capable of controlling the flow of the second reactant from the source 40 into each second and fourth annular conduit, via feed lines represented as 42.

One of the aforementioned first and second reactants comprises fuel and the other of the first and second reactants is gaseous oxidant that comprises oxygen. Suitable fuel preferably comprises hydrogen, any combustible hydrocarbon that is gaseous at 25 C, mixtures of combustible hydrocarbons that are gaseous at 25 C, and mixtures of hydrogen with one or more combustible hydrocarbons that are gaseous at 25 C. Examples of suitable fuels include hydrogen, natural gas, methane, ethane, propane, and butane, and mixtures thereof. Suitable gaseous oxidant comprises air or any gaseous mixture having an oxygen concentration of at least 21 vol. %, preferably at least 70 vol. % oxygen, more preferably at least 90 vol. % oxygen. In preferred modes of operation of the present invention, the first reactant is preferably fuel and the second reactant is preferably gaseous oxidant. The source of fuel (whether 35 or 40 according to this description) can be a storage tank that contains the fuel. The source of oxidant (whether 35 or 40 according to this description) can be a storage tank that contains the oxidant in the gaseous state, in the liquid state, or as a mixture of gas and liquid, which may include a vaporizer to convert liquid oxidant to the gaseous state upon discharge from the source into the associated feed line.

The mechanism represented as 36 is able to control the flow rate of first reactant into each central conduit 11 and 23 and into each of the first and third annular conduits 15 and 28. For proper implementation of this invention, it is important to be able to control, relative to the total amount of first reactant that is fed to all central conduits 11 and to all first annular conduits 15, the relative proportion of the amount of first reactant that is fed to each central conduit 11 and to each first annular conduit 15 in the burners 1 that are closer to the crown of the furnace, relative to the amount of first reactant that is fed to each central conduit 23 and to each third annular conduit 28 in the burners 2 that are closer to the molten glass bath (that is, further from the crown). These respective aspects of control provided by mechanism indicated as 36 can be provided by a single mechanism or by several distinct mechanisms operating together, such as a three-way ball valve, or such as a plurality of valves connected in series.

The mechanism represented as 40 is able to control the flow rate of second reactant into each second annular conduit 21 and each fourth annular conduit 30. For proper implementation of this invention, it is important to be able to control, relative to the total amount of second reactant that is fed to all second annular conduits 21, the relative proportion of the amount of second reactant fed to each second annular conduit 21 in the burners 1 that are closer to the crown of the furnace, relative to the amount of second reactant that is fed to each fourth annular conduit 30 in the burners 2 that are closer to the molten glass bath (that is, further from the crown). These respective aspects of control provided by mechanism indicated as 40 can be provided by a single mechanism or preferably by a plurality of valves operating together.

The mechanisms that control the flows of fuel and oxidant can be provided so that each flow in its own conduit is separately controlled. Alternately, mechanism can be provided that maintains a desired ratio of fuel to oxidant so that when the combustion mode of a set of burners (such as the burners in each given plane, as described herein) is changed from fuel-rich to fuel-lean or from fuel-lean to fuel-rich, the conduits and orifices through which the fuel and oxidant flow can change but the ratios of what is being flowed can be maintained unchanged. In other words, when flows to the first downstream space are fuel-rich, because the ratio of fuel to oxidant flowing there is a particular value that is considered to be fuel-rich, and flows to the second downstream space are fuel-lean, because the ratio of fuel to oxidant flowing there is a particular value that is considered to be fuel-lean, and (as described herein) it is thereafter desired to change the flows into the first downstream space to be fuel-lean and to change the flows into the second downstream space to be fuel-rich, the control mechanisms can be constructed so that the flow rates of fuel and oxidant that conform to the particular values of fuel-rich flow and fuel-lean flow remain the same, but the respective conduits into which the fuel-rich and fuel-lean flows are directed are changed (i.e. reversed) so that a fuel/oxidant stream that had passed to the first downstream space now flows to the second downstream space and a fuel/oxidant stream that had passed to the second downstream space now flows to the first downstream space. This arrangement lets the operator change the characteristics of the flows to the two respective spaces in the furnace, without having to adjust and re-adjust the individual flow rates of the fuel and oxidant.

The view in FIG. 1 shows two burners 1 and 2 in cross-section, but the description is applicable as well to burner apparatus comprising two or more burners 1, and comprising two or more burners 2. The additional burners 1 and 2 are better seen in FIGS. 3 and 4 so viewing them is not blocked as in FIG. 1.

Burner apparatus that is another aspect of the present invention utilizes pluralities of burners 1 and 2 that are positioned in any desired array that provides heat of combustion to the interior 100 of the furnace, from combustion occurring at the outlets of the burners. Most preferably, the burners 1 and 2 are arrayed in two planes with one plane above the other, that is, one plane closer to the crown of the furnace (i.e. further from the surface of the bath) and one plane closer to the surface of the bath.

Figure 3:
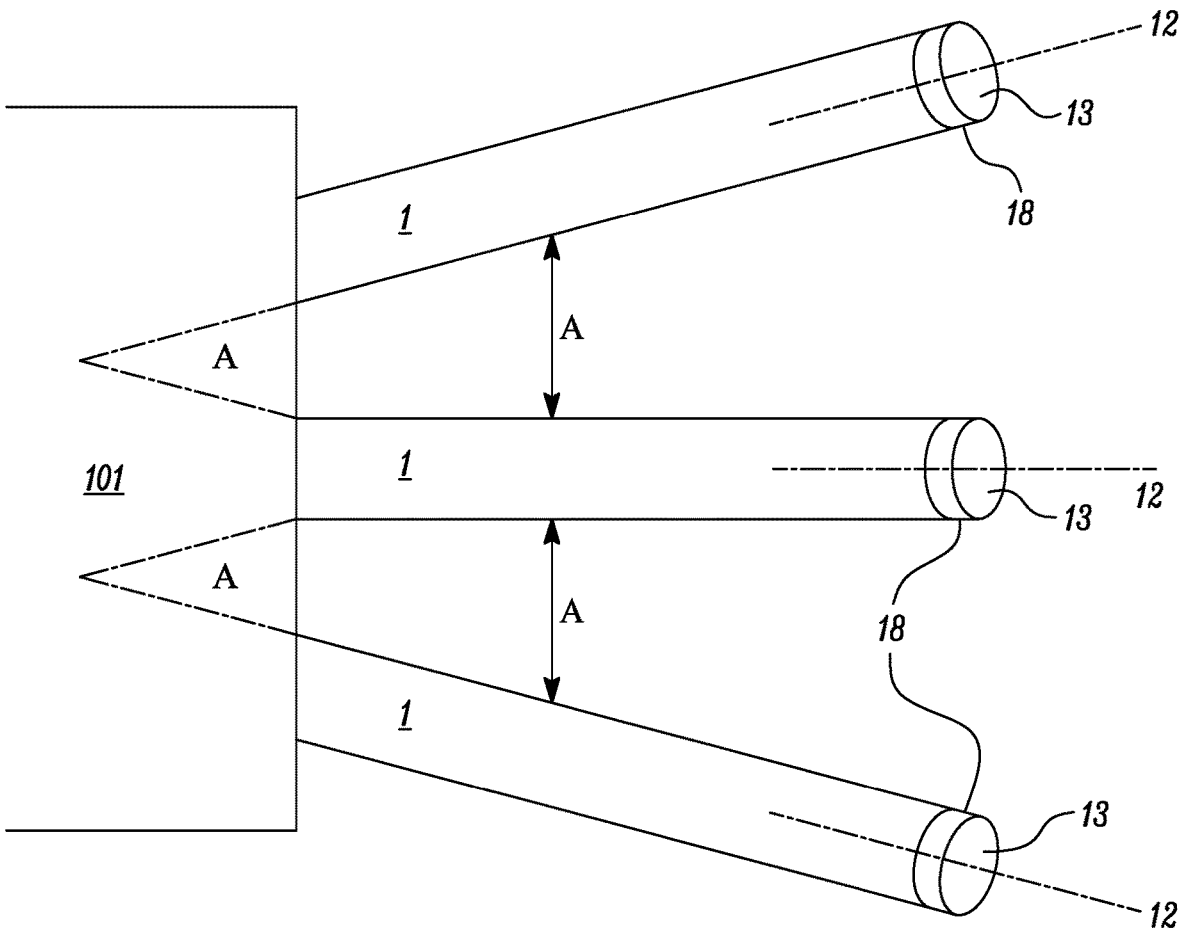
FIG. 3 is a top plan view of a burner apparatus according to the present invention.

One such array comprises a first set of a plurality of burners 1, typically 2 to 10 or 20 burners and preferably such as the three burners shown in FIG. 3, positioned side-by-side in one plane, and a second set of another plurality of burners 2, typically 2 to 10 or 20 burners and preferably such as the three burners positioned side-by-side in another plane (not shown, as it is obscured by the three burners 1 that are shown) that is below the plane in which the first set of burners are arrayed. Referring to FIG. 3, which is an overhead view looking down on the burners in one such plane, it can be seen that the burners 1 extend from a housing 101 which can contain the controls 36 and 41 which control flows of first and second reactants in the feed lines, and which can contain the feed lines by which the first and second reactants are fed to each burner (that is, to the central conduits and to the first and second annular conduits, as described herein). The burners that lie in a given plane can be arrayed so that their respective central axes 12 are parallel to each other, or so that the axes 12 of adjacent burners 1 are at an angle A that is greater than zero degrees up to 10, 20 or even 30 degrees.

Figure 4:
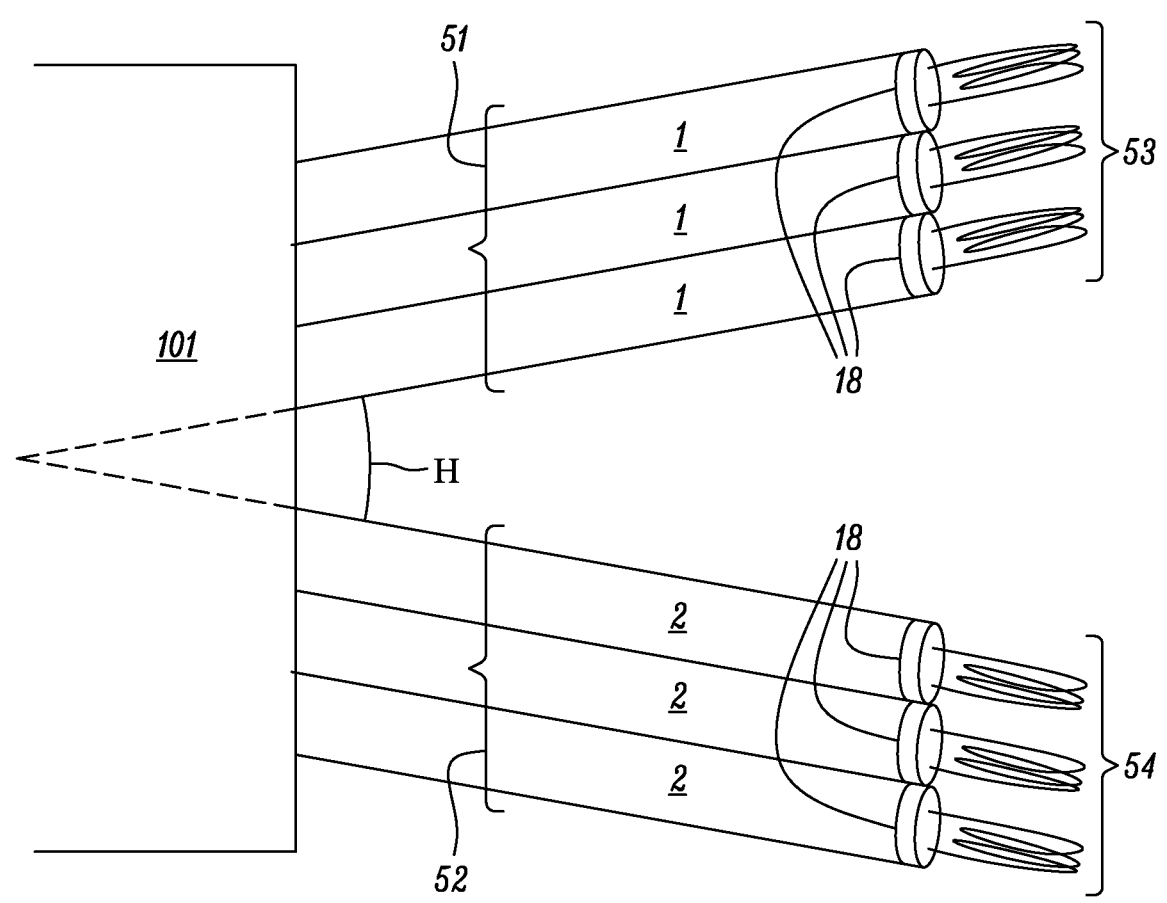
FIG. 4 is a side perspective view of a burner apparatus according to the present invention.

Referring to FIG. 4, two sets of burners are shown, with one set 51 of burners 1 in one plane and another set 52 of burners 2 in another plane that is below (that is, closer to the molten glass bath) the plane of the first set 51 of burners. The planes in which the two sets of burners are located can be parallel to each other, or the planes can be at an angle H with respect to each other that is greater than zero degrees up to 15, 30, 45 or even 60 degrees.

Figure 5:
FIG. 5 is a perspective view of a burner block with which the present invention can be practiced.
Figure 5:
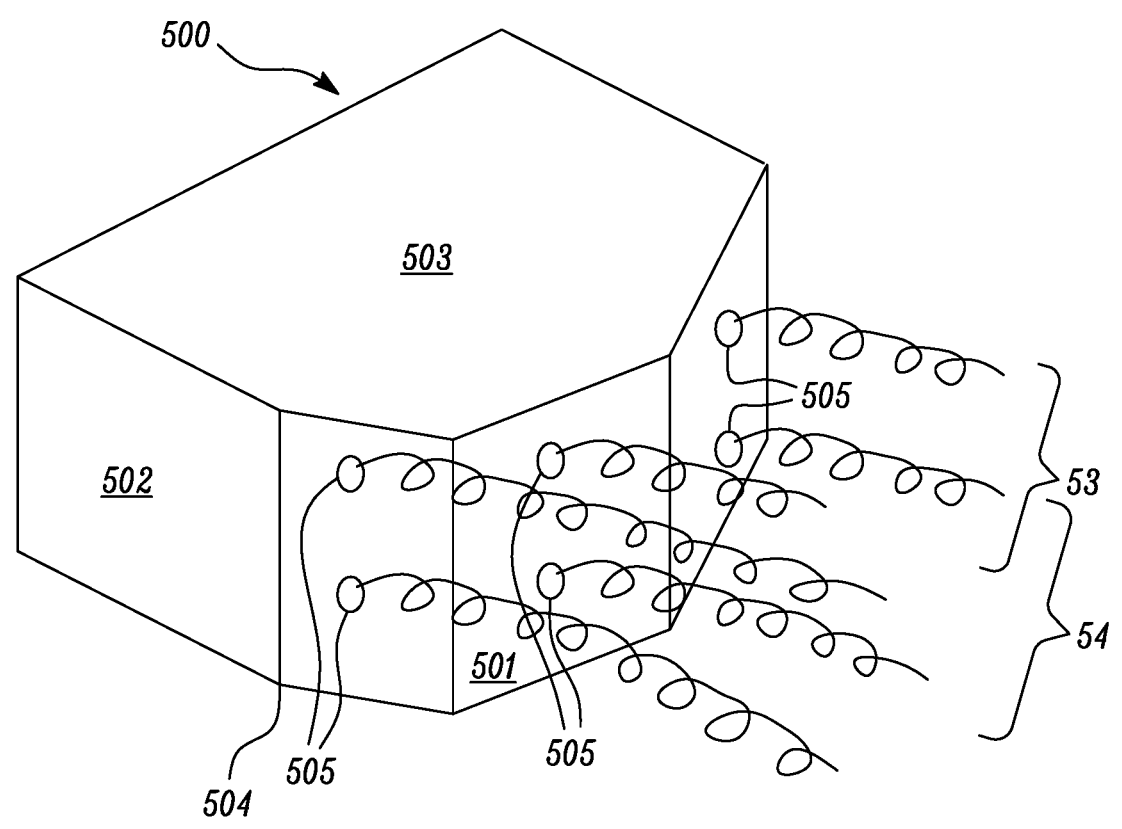

FIG. 5 depicts the exterior of a representative burner block 500 with which the burners of the present invention can be utilized in the formation of burner apparatus that is an aspect of the present invention. Burner block 500 includes a front surface 501 that would face the interior 100 of the furnace. Burner block 500 also includes sides 502, top surface 503, and bottom surface 504. Passages within burner block 500 end in openings 505 in front surface 501. The array of burners 1 and 2 depicted in FIG. 4 would be located inside burner block 500. Each one of the central axes of each of the six burners that appear in FIG. 4 would be aligned with one of the openings 505.

Figure 6:
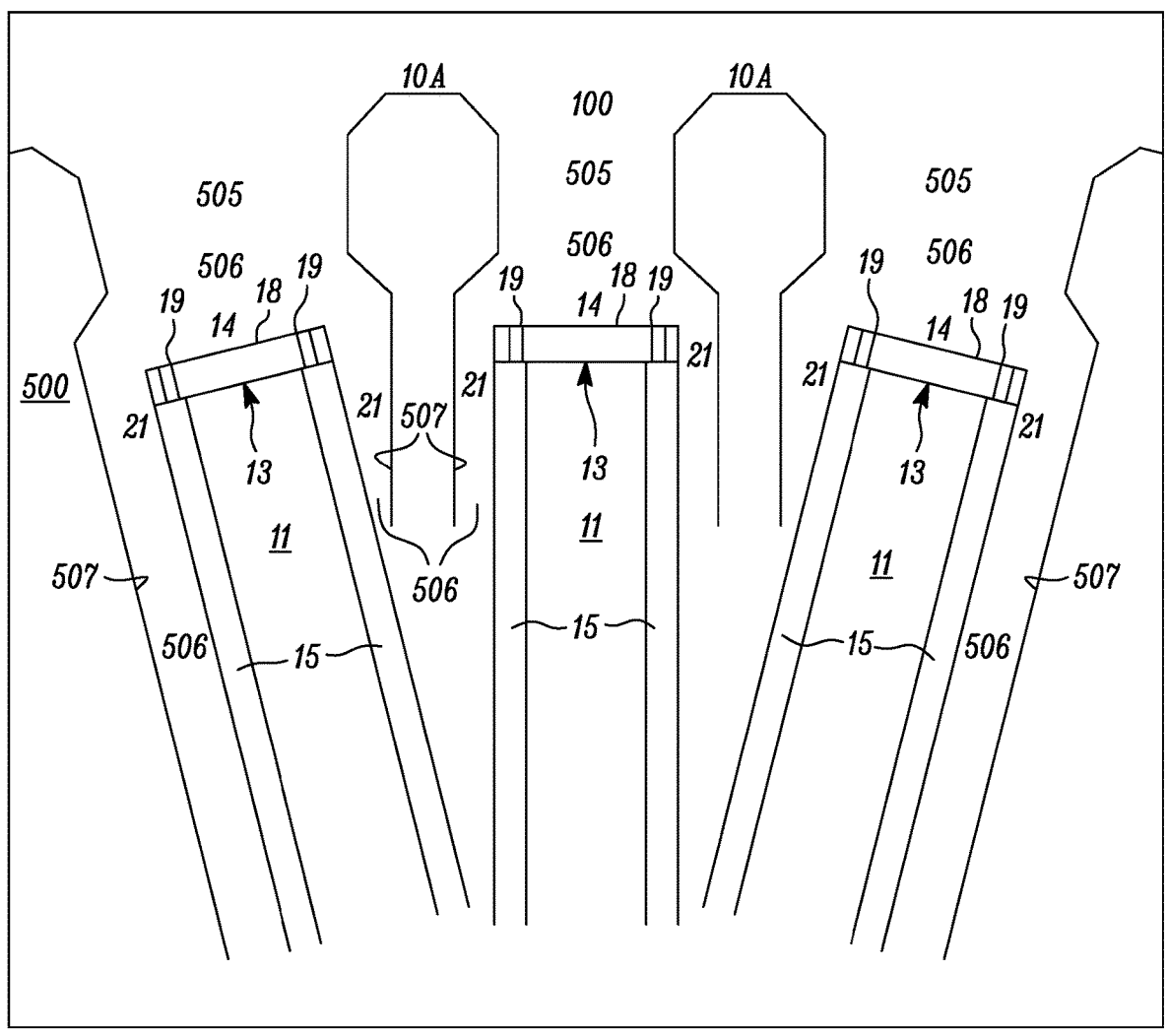
FIG. 6 is a top cross-sectional view of a burner block including a burner apparatus according to the present invention.

FIG. 6 is a cross-sectional view within a burner block 500, looking down from above onto an array of burners 1 that are arrayed all in one plane. Each burner is located in its own passage 506 within burner block 500. Central conduits 11 and first annular conduits 15 are shown, as are second annular conduits 21 that are each situated between an outer wall of the first annular conduits 15 and interior surfaces 507 of the passages 506. The aforementioned downstream regions 14 are outside the outlets 13, within passages 506. Each downstream region 14 communicates with a passage 506 which ends at an opening 505. Preferably, the diameter of each passage 506 downstream from its associated outlet 13 to its opening 505 exhibits a converging-diverging shape in which the diameter of the passage 506 seen in the direction from downstream region 14 to opening 505 decreases, then is constant, and then increases to the opening 505.

Operation

In operation, the burner apparatus is operated so that fuel and oxygen are combusted resulting in flames that are formed at the ends of burners 1 and 2 and the flames extend into the respective downstream spaces 14 and 27 and into the interior 100 of the burner are fuel-rich or fuel-lean, as desired; and preferably so that fuel that passes through the orifices 19 in nozzle plates 18 into the downstream spaces 14 and 27 is continually being combusted with oxygen that is fed into the respective downstream spaces 14 and 27 (which provides desired benefits described below).

The burner apparatus can be operated so that all flames that extend from the ends of burners 1 and 2 toward and into space 100 are fuel-rich; or so that all flames that extend from the ends of burners 1 and 2 toward and into space 100 are fuel-lean; or so that all flames that extend from the ends of burners that are in one plane are fuel-rich and all flames that extend from the ends of burners that are in another plane (i.e. the other plane in the preferred arrangement wherein there are two planes of burners) are fuel-lean. A flame in the aggregate extends from the burners that are in a given plane and is formed by a combination of the flames from each of those burners. The flame in the aggregate can be fuel-rich, or fuel-lean. In a given plane, a flame that in the aggregate is fuel-rich can be formed from flames from individual burners in that plane wherein the flame from each burner in the plane is fuel-rich, or a flame that is fuel-rich in the aggregate can be formed from flames that extend from the burners wherein one or more of the flames are fuel-rich and one or more are fuel-lean, provided that the overall characteristic of the aggregate flame is fuel-rich. Similarly, in a given plane, a flame that in the aggregate is fuel-lean can be formed from flames from individual burners in that plane wherein the flame from each burner in the plane is fuel-lean, or a flame that is fuel-lean in the aggregate can be formed from flames that extend from the burners wherein one or more of the flames are fuel-lean and one or more are fuel-rich, provided that the overall characteristic of the aggregate flame is fuel-lean. In preferred operating modes described below, the fuel-rich and fuel-lean characteristics of flames from burners, or from the respective planes in which burners are situated, are switched periodically.

To produce a fuel-rich flame from a particular burner, fuel and oxidant are fed from their respective sources into the burner at relative rates such that there is a stoichiometric excess of fuel relative to the amount of oxygen that is fed to the burner. That is, the amount of oxygen that is present in the oxidant fed to the burner would be less than the amount of oxygen that would be required to completely combust (that is, to convert fully to $H_2O$ and, if the fuel contains carbon, to $CO_2$) all of the fuel that is fed to the burner. The appropriate stoichiometric ratios can readily be satisfied based on knowledge of the oxygen content of the oxidant streams, and the flow rates of the oxidant and fuel streams.

To produce a fuel-lean flame from a particular burner, fuel and oxidant are fed from their respective sources into the burner at relative rates such that there is a stoichiometric excess of oxygen relative to the amount of fuel that is fed to the burner. That is, the amount of oxygen that is present in the oxidant fed to the burner would be higher than the amount of oxygen that would be required to completely combust (that is, to convert fully to $H_2O$ and, if the fuel contains carbon, to $CO_2$) all of the fuel that is fed to the burner. The appropriate stoichiometric ratios can readily be satisfied based on knowledge of the oxygen content of the oxidant streams, and the flow rates of the oxidant and fuel streams.

For overall efficiency of the furnace operation, the total amount of oxygen that is provided in the oxidant streams which are fed to all the burners 1 and 2 (including fed to the first and third annular conduits) should be sufficient to completely combust all of the fuel that is fed thereto. Staging the combustion of the fuel that is fed to the burners, by combusting only partially the fuel that is fed to the burners 1 and 2 and passing incompletely combusted fuel into the furnace, and then more completely combusting the incompletely combusted fuel with oxygen that enters the furnace, results in lower formation of NOx (by which is meant oxides of nitrogen and mixtures of oxides of nitrogen) compared to the NOx formation that would result from combusting all of the fuel at only the burners. For purposes of staging combustion and reducing NOx formation, from a portion (typically 50 vol. % to 100 vol. % and preferably 90 vol. % to 97 vol. % of the oxygen that combusts the fuel that is fed to the furnace should be fed to the second or fourth annular conduits of the burner(s) that are operated fuel-lean, and the remainder of the oxygen should be fed through the second or fourth conduits of the burner(s) that are operated fuel-rich.

The amount of fuel that is fed into each downstream space 14 and 27 and combusted there should be sufficient to maintain the temperature in interior space 100 at a temperature of 1500 F or higher, but not so high as to cause melting or disintegration of the solid material from which the burner block 10 is formed.

Combusting fuel that enters into spaces 14 and 27 from orifices 19 provides elevated temperature within the spaces 14 and 27. This elevated temperature at these locations provides a significant advantage, namely, that the formation of solid deposits in the spaces 14 and 27 and on the adjacent surfaces is diminished or eliminated. Without the combustion at the outside faces 18A of the orifice plates 18, substances in the atmosphere within the furnace which are in the gaseous state, or which are in finely divided suspended particulate state, may condense onto surfaces in the spaces 14 and 27 and/or onto adjacent surfaces because those surfaces may tend to be relatively cooler than the rest of the furnace atmosphere. Whether these condensed deposits are solids or liquids, the formation of deposits leads to operational difficulties such as narrowing and plugging of openings, loss of uniformity of the flame, pressure variability, and pieces of deposits falling into the molten glass in the bath and damaging the quality or uniformity of the molten glass. Preferably, combustion at the orifices 19 in each space 14 and 27 is carried out continuously without interruption, regardless of whether the overall combustion product in space 14 and 27 is fuel-rich or fuel-lean.

The advantage of the present invention, that the formation of such deposits is reduced or eliminated, is particularly valuable in the operation of glassmelting furnaces, because glassmaking materials that are typically fed into glassmaking furnaces and are melted therein often contain materials that upon being heated to glassmelting temperatures form products including oxides, hydroxides and/or sulfates of sodium and/or potassium, or even fully reduced metallic sodium and/or potassium. These products can enter the gaseous atmosphere in the furnace, and then could condense to form the aforementioned deposits on surfaces of the furnace.

A particularly preferred application of the present invention is in operating a glassmelting furnace. Glassmaking materials that may comprise one or more of oxides, hydroxides, silicates, and carbonates of sodium and oxides, hydroxides, silicates, and carbonates of potassium, and mixtures thereof (which are referred to as "batch"), and/or pieces of broken glass (referred to as "cullet") are fed into a furnace and melted by heat of combustion of fuel, wherein the combustion includes combusting fuel and oxidant in the manner described herein. The heat of combustion in furnace 100 melts the glassmaking material and forms a bath of molten glass, which is withdrawn from furnace 100 for further processing represented which may include fining and other steps that are conventional in the manufacture of glass.

In this preferred application, the burners in one plane are operated in one of modes (A) or (B), while the burners in the other plane are operated in the other of modes (A) or (B), and the mode in which each set of burners is operated is periodically alternatingly switched between the two modes, that is, from mode (A) to mode (B), back to mode (A), and back to mode (B), and similarly onward. The switching of one plane of burners from mode (A) to mode (B) can occur at the same time that the other plane of burners is switched from mode (B) to mode (A), or a first plane of burners can be switched from one mode to the other without switching the second plane, so that for a period of time both planes are in the same mode; and then the second plane is switched from its mode to the other mode.

In a preferred embodiment of this application, in mode (A) fuel is fed from the first central outlet and from the first annular conduit nozzle into the first downstream space;

oxidant is fed from the second annular outlet into the first downstream space, in an amount which is insufficient to completely combust with all of the fuel fed from the first central outlet and from the first annular conduit nozzle; and the fuel fed from the first central outlet and from the first annular conduit nozzle is incompletely combusted with the oxidant fed from the second annular outlet, to create a fuel-rich mixture of products of said combustion in the first downstream space; while fuel is fed from the second central outlet and from the third annular conduit nozzle into the second downstream space;

oxidant is fed from the fourth annular nozzle into the second downstream space, in an amount which exceeds the amount that is necessary to completely combust with all of said fuel fed from said second central outlet and from said third annular conduit nozzle; and the fuel fed from the second central outlet and from the third annular conduit nozzle is combusted with said oxidant fed from the fourth annular outlet, to create a fuel-lean mixture of products of said combustion in said second downstream space.

The respective fuel-rich mixture and fuel-lean mixture are fed from their respective downstream spaces into the interior 100 of the furnace. As the first downstream space is located above the second downstream space, operating in mode (A) results in the fuel-lean layer of products (which is chemically oxidizing) being located closer to the surface of the bath than the fuel-rich layer (which is chemically reducing). The fuel-rich layer may also contain soot formed by chemical cracking of components of the fuel. This arrangement of the fuel-lean and fuel-rich layers is preferably established when the surface of the bath of molten glass is not exhibiting the "foam" that is described above. The radiant flame formed when the fuel-rich flame layer and the fuel-lean flame layer interact with each other in the furnace impart heat to the bath.

In FIGS. 4 and 5, in mode (A) the fuel-rich flame layer is 53, and the fuel-lean flame layer is 54.

Continuing in this preferred embodiment, in mode (B) fuel is fed from the first central outlet and from the first annular conduit nozzle into the first downstream space;

oxidant is fed from the second annular outlet into said first downstream space, in an amount which exceeds the amount that is sufficient to completely combust with all of said fuel fed from said first central outlet and from said first annular conduit nozzle; and the fuel fed from the first central outlet and from the first annular conduit nozzle is combusted with said oxidant fed from the second annular conduit, to create a fuel-lean mixture of products of said combustion in said first downstream space, while fuel is fed from the second central outlet and from the third annular conduit nozzle into the second downstream space;

oxidant is fed from the fourth annular conduit into the second downstream space in an amount which is insufficient to completely combust with all of said fuel fed from said second central outlet and from said third annular conduit nozzle; and the fuel fed from the second central outlet and from the third annular conduit nozzle is incompletely combusted with said oxidant fed from the fourth annular conduit to create a fuel-rich mixture of products of said combustion in said second downstream space;

The respective fuel-rich mixture and fuel-lean mixture are fed from their respective downstream spaces into the interior 100 of the furnace. As the first downstream space is located above said second downstream space, operating in mode (B) results in the fuel-rich layer of products (which is chemically reducing) being located closer to the surface of the bath than the fuel-lean layer (which is chemically oxidizing). The fuel-rich layer may also contain soot formed by chemical cracking of components of the fuel upon feeding of the fuel into the downstream space. This arrangement of the fuel-lean and fuel-rich layers is preferably established when the surface of the bath of molten glass is exhibiting the "foam" that is described above. The chemically reducing characteristic of the fuel-rich layer interacts with the foam and removes some or all of the foam. This interaction is enhanced when the fuel-rich layer contains soot. The radiant flame formed when the fuel-rich flame layer and the fuel-lean flame layer interact with each other in the furnace impart heat to the bath.

In FIGS. 4 and 5, in mode (B) the fuel-lean flame layer is 53, and the fuel-rich flame layer is 54.

The switching between modes (A) and (B), and indeed any change in any burner from formation of a fuel-rich flame to a fuel-lean flame or from a fuel-lean flame to a fuel-rich flame, can be carried out by adjusting the flow rates of the first and second reactants with the aforementioned controls 36 and 41. The switching and changing can be carried out manually, that is, by the operator observing the conditions in the furnace and deciding when to change the conditions and the magnitude of the changes. The switching and changing can instead be carried out automatically, by including a sensor represented as 39 which detects one or more characteristics in the furnace, and which signals the controls 36 and 41 to change the rates and the relative rates of fuel and oxidant in response to the detected characteristic(s) exhibiting a predetermined value at which the characteristics of the feed of fuel and oxidant is to be changed or switched. Examples of characteristics that could be detected by sensor 39 and acted on by controls 36 and 41 include the temperature of a surface within the furnace such as surface 10A; the temperature of the bath of molten glass; the amount that is present, or the vapor pressure, of a component (such as $H_2O$, $O_2$, $CO_2$, or $SO_2$) of the gaseous atmosphere within the furnace; or the reflectivity of the surface of the molten glass bath.

The following Table sets forth ranges of preferred values of the amounts of fuel and oxygen that are fed to the respective conduits of the burners in the practice of this invention. In this table, the "upper flame layer" and the "lower flame layer" refer to the flames that emerge from the burners that are arrayed as shown FIG. 4. The "lower flame layer" refers to the flames that are produced by the burners 2 that are in plane 52 which plane is closer to the surface of the molten glass bath than are the flames that are produced by the burners that are in plane 51 which is the "upper flame layer" and which is further from the surface of the molten glass bath.

TABLE

| | Upper flame layer is fuel-rich/ Lower flame layer is fuel-lean | Upper flame layer is fuel-lean/ Lower flame layer is fuel-rich |
|---|---|---|
| Equivalence ratio (ER) | 0.5 to 2.0 | 0.5 to 2.0 |
| Note: | | |
| 1. ER is defined as the ratio of the actual fuel/oxidant ratio (AR) to the stoichiometric fuel/oxidant ratio (SR). | | |
| 2. AR is defined as the ratio of actual amount of fuel to actual amount of oxidant being supplied to the combustion apparatus. | | |
| 3. SR is defined as the ratio of a unit amount of fuel to the exact amount of oxidant required to completely combust the unit amount of fuel. | | |
| Fuel fed, as % of total | XXX | XXX |

TABLE-continued

| | Upper flame layer is fuel-rich/ Lower flame layer is fuel-lean | Upper flame layer is fuel-lean/ Lower flame layer is fuel-rich |
|---|---|---|
| fuel fed to all burners: | | |
| Fuel fed to upper burner array | 50% to 100%, but preferably 60% to 93% | 0% to 50%, but preferably 7% to 40% |
| Fuel fed to lower burner array | 0% to 50%, but preferably 7% to 40% | 50% to 100%, but preferably 60% to 93% |
| Fuel fed to upper burner central conduit | 40% to 91% | 5% to 20% |
| Fuel fed to upper burner $1^{st}$ annular conduit | 2% to 20% | 2% to 20% |
| Fuel fed to lower burner central conduit | 5% to 20% | 40% to 91% |
| Fuel fed to lower burner $3^{rd}$ annular conduit | 2% to 20% | 2% to 20% |
| Velocity of: | XXX | XXX |
| Fuel exiting upper burner central conduit | 20 ft/sec to 300 ft/sec | 1 ft/sec to 40 ft/sec |
| Fuel exiting upper burner $1^{st}$ nozzle plate | 10 ft/sec to 800 ft/sec | 10 ft/sec to 800 ft/sec |
| Fuel exiting lower burner central conduit | 1 ft/sec to 40 ft/sec | 20 ft/sec to 300 ft/sec |
| Fuel exiting lower burner $3^{rd}$ nozzle plate | 10 ft/sec to 800 ft/sec | 10 ft/sec to 800 ft/sec |
| Ratio of velocity of fuel exiting nozzle plate orifices to velocity of fuel exiting central conduit that the nozzle plate surrounds in the upper burner array | 1:100 to 100:1, but preferably 1:30 to 40:1 | 1:100 to 100:1, but preferably 1:40 to 80:1 |
| Ratio of velocity of fuel exiting nozzle plate orifices to velocity of fuel exiting central conduit that the nozzle plate surrounds in the lower burner array | 1:100 to 100:1, but preferably 1:40 to 80:1 | 1:100 to 100:1, bu tpreferably 1:30 to 40:1 |
| Oxygen fed, as % of total oxygen fed to all burners: | XXX | XXX |
| Oxygen fed to upper burner $2^{nd}$ annular conduit | 50% to 100%, but preferably 85% to 98% | 0% to 50%, but preferably 2% to 15% |
| Oxygen fed to lower burner $4^{th}$ annular conduit | 0% to 50%, but preferably 2% to 15% | 50% to 100%, but preferably 85% to 98% |

What is claimed is:

1. A burner comprising:

a central conduit having a central axis and terminating in a central outlet which opens into a downstream space;

a first annular conduit surrounding the central conduit, the first annular conduit and the central conduit being separated by an annular wall, wherein the first annular conduit terminates in an outlet which opens into said downstream space, wherein the first annular conduit comprises a nozzle plate across the outlet of the first annular conduit, wherein the nozzle plate comprises a plurality of orifices that extend through the nozzle plate from within the first annular conduit to the downstream space;

wherein the central conduit and the first annular conduit are each connected to a source of a first reactant through mechanism with which the flow of the first reactant from the source thereof into the central conduit and the flow of the first reactant from the source thereof into the first annular conduit can be controlled; and a second annular conduit surrounding the first annular conduit and terminating in a second annular outlet which opens into said downstream space, wherein the second annular conduit is connected to a source of a second reactant through mechanism with which the flow of the second reactant from the source thereof into the second annular conduit can be controlled;

wherein one of the first and second reactants comprises fuel and the other of the first and second reactants is oxidant that comprises oxygen.

2. A burner according to claim 1 wherein the first reactant is fuel and the second reactant comprises oxygen.

3. Combustion apparatus comprising:

a first burner comprising a first central conduit having a central axis and terminating in a first central outlet which opens into a first downstream space;

a first annular conduit surrounding the first central conduit, the first annular conduit and the first central conduit being separated by an annular wall, wherein the first annular conduit terminates in an outlet which opens into said first downstream space, wherein the first annular conduit comprises a nozzle plate across the outlet of the first annular conduit, wherein the nozzle plate comprises a plurality of orifices that extend through the nozzle plate from within the first annular conduit to the first downstream space;

wherein the first central conduit and the first annular conduit are each connected to a source of a first reactant through mechanism with which the flow of the first reactant from the source thereof into the first central conduit and the flow of the first reactant from the source thereof into the first annular conduit can be controlled; and a second annular conduit surrounding the first annular conduit and terminating in a second annular outlet which opens into said first downstream space, wherein the second annular conduit is connected to a source of a second reactant through mechanism with which the flow of the second reactant from the source thereof into the second annular conduit can be controlled; and a second burner comprising a second central conduit having a central axis and terminating in a second central outlet which opens into a second downstream space;

a third annular conduit surrounding the second central conduit, the third annular conduit and the second central conduit being separated by an annular wall, wherein the third annular conduit terminates in an outlet which opens into said second downstream space, wherein the third annular conduit comprises a nozzle plate across the outlet of the third annular conduit, wherein the nozzle plate comprises a plurality of orifices that extend through the nozzle plate from within the third annular conduit to the second downstream space;

wherein the second central conduit and the third annular conduit are connected to a source of said first reactant through mechanism with which the flow of the first reactant from the source thereof into the second central conduit and the flow of the first reactant from the source thereof into the third annular conduit can be controlled; and a fourth annular conduit surrounding the third annular conduit and terminating in a fourth annular outlet which opens into said second downstream space, wherein the fourth annular conduit is connected to a source of said second reactant through mechanism with which the flow of the second reactant from the source thereof into the fourth annular conduit can be controlled;

wherein the central axis of the first central conduit is above the central axis of the second central conduit;

wherein one of the first and second reactants comprises fuel and the other of the first and second reactants is oxidant that comprises oxygen.

4. Combustion apparatus according to claim 3 wherein the first reactant comprises fuel and the second reactant comprises oxygen.

5. Combustion apparatus according to claim 3 comprising a plurality of said first burners, and further comprising a plurality of said second burners, wherein the central axes of all of said first burners are above the central axes of all of said second burners.

6. Combustion apparatus according to claim 5 wherein all of said plurality of first burners lie in a first plane and all of said plurality of second burners lie in a second plane that is not said first plane.

7. Combustion apparatus according to claim 6 wherein one or both of said first and second planes is horizontal.

8. Combustion apparatus according to claim 6 wherein said first and second planes are both horizontal.

9. Combustion apparatus according to claim 6 wherein said first and second planes intersect.

10. A method of combustion in a furnace, comprising:

providing combustion apparatus according to claim 3;

feeding fuel from the first central outlet and from the first annular conduit nozzle plate of said first burner into a first downstream space within said furnace;

feeding oxidant from the second annular outlet of said first burner into said first downstream space, and combusting said fuel fed from the first central outlet and from the first annular conduit nozzle plate with said oxidant fed from the second annular outlet, to create a mixture of products of said combustion in said first downstream space; while feeding fuel from the second central outlet and from the third annular conduit nozzle plate of said second burner into a second downstream space within said furnace;

feeding oxidant from the fourth annular outlet of said second burner into said second downstream space, and combusting said fuel fed from the second central outlet and from the third annular conduit nozzle plate with said oxidant fed from the fourth annular outlet, to create a mixture of products of said combustion in said second downstream space;

wherein said first downstream space is located above said second downstream space.

11. A method according to claim 10 further comprising continuously combusting said fuel fed from the nozzle plates that are across the outlets of said first and third annular conduits.

12. A method of combustion in a furnace, comprising:

providing combustion apparatus that comprises a plurality of first burners comprising a first central conduit having a central axis and terminating in a first central outlet which opens into a first downstream space;

a first annular conduit surrounding the first central conduit, the first annular conduit and the first central conduit being separated by an annular wall, wherein the first annular conduit terminates in an outlet which opens into said first downstream space, wherein the first annular conduit comprises a nozzle plate across the outlet of the first annular conduit, wherein the nozzle plate comprises a plurality of orifices that extend through the nozzle plate from within the first annular conduit to the first downstream space;

wherein the first central conduit and the first annular conduit are each connected to a source of a first reactant through mechanism with which the flow of the first reactant from the source thereof into the first central conduit and the flow of the first reactant from the source thereof into the first annular conduit can be controlled; and a second annular conduit surrounding the first annular conduit and terminating in a second annular outlet which opens into said first downstream space, wherein the second annular conduit is connected to a source of a second reactant through mechanism with which the flow of the second reactant from the source thereof into the second annular conduit can be controlled; and a plurality of second burners comprising a second central conduit having a central axis and terminating in a second central outlet which opens into a second downstream space;

a third annular conduit surrounding the second central conduit, the third annular conduit and the second central conduit being separated by an annular wall, wherein the third annular conduit terminates in an outlet which opens into said second downstream space, wherein the third annular conduit comprises a nozzle plate across the outlet of the third annular conduit, wherein the nozzle plate comprises a plurality of orifices that extend through the nozzle plate from within the third annular conduit to the second downstream space;

wherein the second central conduit and the third annular conduit are connected to a source of said first reactant through mechanism with which the flow of the first reactant from the source thereof into the second central conduit and the flow of the first reactant from the source thereof into the third annular conduit can be controlled; and a fourth annular conduit surrounding the third annular conduit and terminating in a fourth annular outlet which opens into said second downstream space, wherein the fourth annular conduit is connected to a source of said second reactant through mechanism with which the flow of the second reactant from the source thereof into the fourth annular conduit can be controlled;

wherein the central axes of all of said first burners are above the central axes of all of said second burners;

wherein one of the first and second reactants comprises fuel and the other of the first and second reactants is oxidant that comprises oxygen;

feeding fuel from the first central outlets and from the first annular conduit nozzle plates of each of said first burners into a first downstream space within said furnace;

feeding oxidant from the second annular outlets of each of said first burners into said first downstream space, and combusting said fuel fed from the first central outlets and from the first annular conduit nozzle plates with said oxidant fed from the second annular outlets, to create a mixture of products of said combustion which pass into said first downstream space; while feeding fuel from the second central outlets and from the third annular conduit nozzle plates of each of said second burners into a second downstream space within said furnace;

feeding oxidant from the fourth annular outlets of each of said second burners into said second downstream space, and combusting said fuel fed from the second central outlets and from the third annular conduit nozzle plates with said oxidant fed from the fourth annular outlets, to create a mixture of products of said combustion which pass into said second downstream space.

13. A method according to claim 12 further comprising continuously combusting said fuel fed from the nozzle plates that are across the outlets of each of said first and third annular conduits.

14. A method according to claim 12 wherein all of said plurality of first burners lie in a first plane and all of said plurality of second burners lie in a second plane that is not said first plane, and said first plane is above said second plane.

15. A method according to claim 14 wherein one or both of said first and second planes is horizontal.

16. A method according to claim 14 wherein said first and second planes are both horizontal.

17. A method according to claim 14 wherein said first and second planes intersect.

18. A method according to claim 12 wherein the mixture of products of combustion which pass into one of said first downstream space and said second downstream space is fuel-rich and the mixture of products of combustion which pass into the other of said first downstream space and said second downstream space is fuel-lean.

19. A method according to claim 18 wherein the mixture of products of combustion which pass into said first downstream space is fuel-rich and the combustion at each of said first burners produces fuel-rich combustion products.

20. A method according to claim 18 wherein the mixture of products of combustion which pass into said first downstream space is fuel-lean and the combustion at each of said first burners produces fuel-lean combustion products.

21. A method according to claim 18 wherein the mixture of products of combustion which pass into said second downstream space is fuel-rich and the combustion at each of said second burners produces fuel-rich combustion products.

22. A method according to claim 18 wherein the mixture of products of combustion which pass into said second downstream space is fuel-lean and the combustion at each of said second burners produces fuel-lean combustion products.

23. A method according to claim 18 wherein alternatingly (A) the mixture of products of combustion which pass into said first downstream space is fuel-rich and the mixture of products of combustion which pass into said second downstream space is fuel-lean, and (B) the mixture of products of combustion which pass into said first downstream space is fuel-lean and the mixture of products of combustion which pass into said second downstream space is fuel-rich.

24. A method according to claim 12 wherein said furnace contains a bath of molten glass.

25. A method according to claim 13 wherein said furnace contains a bath of molten glass.

26. A method according to claim 14 wherein said furnace contains a bath of molten glass.

27. A method according to claim 18 wherein said furnace contains a bath of molten glass.

28. A method according to claim 23 wherein said furnace contains a bath of molten glass.

29. A method according to claim 28 which alternates between (A) and (B) in response to a detected characteristic of said bath of molten glass.

\* \* \* \* \*